July 13, 1948.  R. T. MARETTE ET AL  2,445,073
VAPOR DETECTOR
Filed Oct. 24, 1945
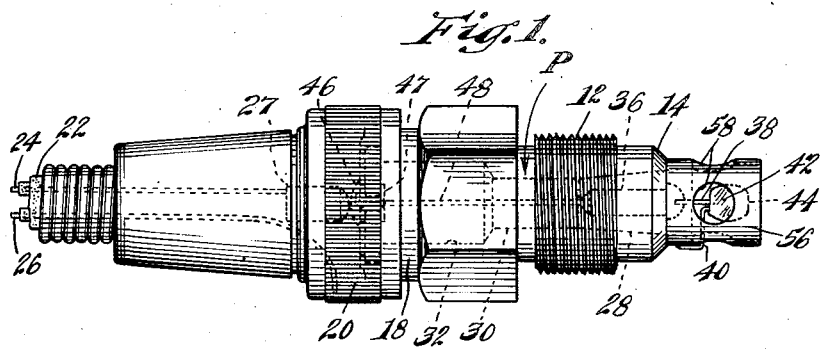
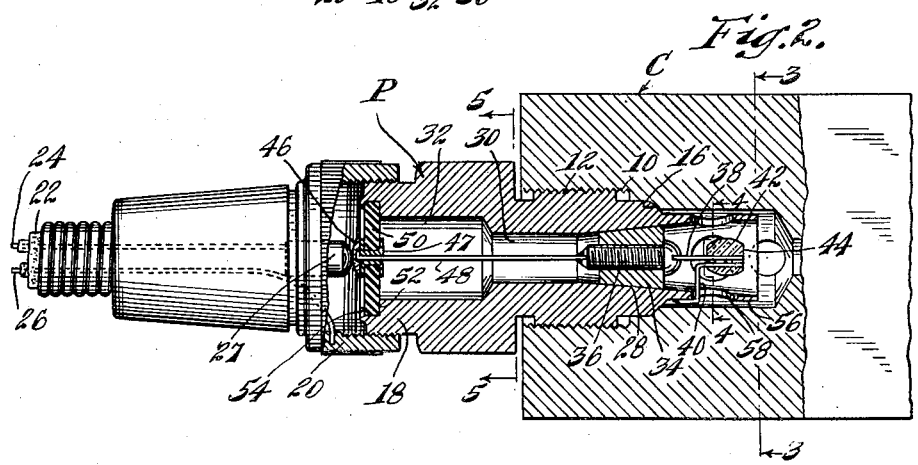
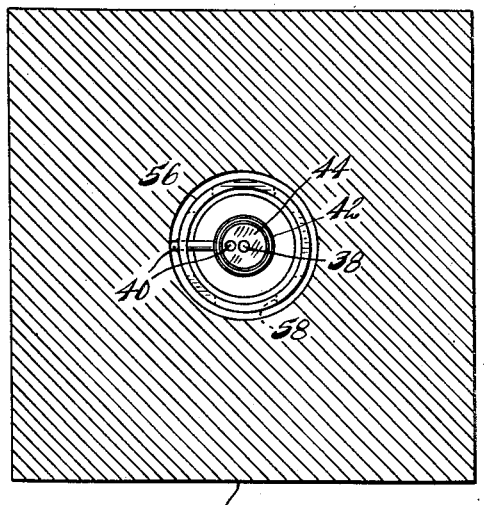
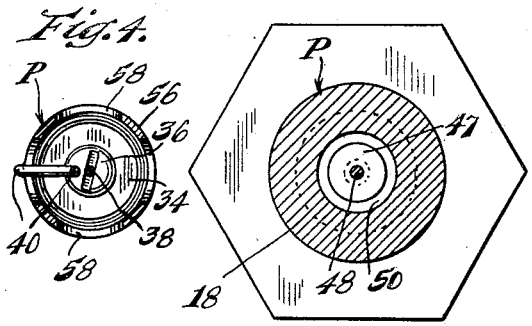
INVENTORS.
Ralph T. Marette
and Wilbur R. Richards,
By Bair & Freeman
Atty's.

Patented July 13, 1948

UNITED STATES PATENT OFFICE 2,445,073

VAPOR DETECTOR

Ralph T. Marette and Wilbur R. Richards, Cleveland, Ohio, assignors to The Aro Equipment Corporation, Bryan, Ohio, a corporation of Ohio Application October 24, 1945, Serial No. 624,132

11 Claims. (Cl. 201—48)

Our present invention relates to a vapor detector of the type wherein a pair of electrodes is designed to have a chemical film applied thereto, with the film subjected to a flowing gas which is to be tested, and the electrical resistance of the chemical film changing in accordance with the water vapor content of the flowing gas.

One object of the invention is to provide a vapor detector wherein the electrodes are supported in spaced relation to each other and insulated from each other in a novel manner which eliminates the necessity of providing a gas-tight bond between the electrodes and the insulation which will withstand high pressures.

Another object is to provide a vapor detector having a plug body for mounting it in a cell block or the like so that it can be readily removed therefrom for renewing the chemical film on the electrodes, the plug body having a portion protecting the electrodes against injury.

Still another object is to provide a vapor detector plug which has parts assembled in a novel manner which permits of effectively insulating one of the electrodes from the plug body itself and at the same time sealing the electrode against any leakage of air outwardly around the insulating material.

A further object is to provide an insulator for a circuit wire of the detector which is in the form of a tapered plug arranged to tend to tighten in the bore of the plug body by reason of being subjected to high pressure in a cell block or the like.

Still a further object is to provide an electrode construction for a vapor detector which mounts a pair of electrodes closely adjacent each other within a fused quartz or glass bead which can be ground off to a plane surface with the ground-off ends of the electrodes closely adjacent each other on such surface, to which surface a chemical film can be applied for vapor detection purposes.

With these and other objects in view, our invention consists in the construction, arrangement and combination of the various parts of our device whereby the objects contemplated are attained, as hereinafter more fully set forth, pointed out in the claims and illustrated in the accompanying drawings, wherein:

Fig. 1 is an elevation of a vapor detector embodying our invention and showing it about double scale, although it can be any size;

Fig. 2 is a partial sectional view thereof showing the detector mounted in a cell block;

Fig. 3 is an enlarged sectional view on the line 3—3 of Fig. 2 showing an end view of the inner end of the detector; and Figs. 4 and 5 are enlarged sectional views on the lines 4—4 and 5—5 respectively of Fig. 2.

On the accompanying drawing we have used the reference character P to indicate a plug body which has a threaded portion 12 adapted to thread into an opening 10 of a cell block C or the like. The plug body P has a tapered seat 14 coacting with a similarly tapered seat 16 in the cell block to provide a gas-tight joint which will withstand extremely high pressures within the cell block.

The plug body P also has a threaded portion 18 onto which a connector 20 of an electric cable 22 may be removably screwed. The cable 22 has a pair of wires 24 and 26, the wire 24 extending to a contact 27 and the wire 26 being grounded to the connector 20 so that when the connector is screwed onto the plug body there will be a grounded connection therewith.

The plug body P has a bore comprising a tapered portion 28 and two other portions 30 and 32, as best illustrated in Fig. 2. Seated in the tapered portion 28 of the bore is a tapered plug 34, the plug being formed preferably of plastic material, such as Bakelite or the like, and preferably cemented in position. A terminal screw 36 is threaded through the plug 34 and turned down tight and cemented so as to provide a gas-tight connection therewith. An electrode 38, in the form of a short piece of platinum wire, is soldered into the slot of the screw 36. A second electrode 40 in the form of a short piece of platinum wire bent Z-shaped is provided, and it has its lower end electrically anchored to the plug body P as by solder or the like. An insulating bead 42 is formed around the electrodes 38 and 40, and this bead may be formed of fused glass, which would have an initial globular shape, and, as used in the detector, is ground off to provide a face 44 at substantially right angles to the electrodes 38 and 40.

Electrical connection is made from the wire 24 to the terminal 36 by means of a second contact 46 coacting with the contact 27. The contact 46 is formed of soft solder in an eyelet 47 and serves to electrically connect one end of a wire 48 with the eyelet. The other end of the wire 48 is soldered to the terminal screw 36. The eyelet 47 is mounted in an insulating washer 50, retained against a shoulder 52 by a spun-over portion 54 of the plug body P.

Heretofore, vapor detectors have been provided wherein a tubular electrode surrounded a rod-like electrode, the two being insulated from each other by a glass sleeve between them. The exposed surfaces of the electrodes and the glass tube were polished smooth to accommodate the acid film, but difficulty was experienced both in the manufacture and operation of this type of vapor detector. Tests are made under pressures as high as three thousand pounds per square inch, and such pressure tends to cause the gas to seep through between the glass and the electrodes and even crack the glass.

With our arrangement the entire bead 42 is surrounded by the gas, so that no matter what the pressure, it is equalized all around the insulator and electrodes. It then becomes necessary only to prevent the escape of gas around the insulator for the ungrounded electrode, and we do this by the screw 36 screwed and cemented tightly into the tapered plug 34 and the plug, in turn, cemented and driven tightly into the tapered bore 28 of the plug body. With such an arrangement all possibility of gas escape is eliminated, and there is no unequalized gas pressure on the insulator for the electrodes which can tend to crack the glass of the insulator or undesirably pass through crevices between the insulator and the electrodes.

As to the use of the vapor detector, it may be generally stated that a thin film of chemical, such as phosphoric acid, deposited on the face 44 of the detector, has the property of quickly changing in electrical resistance with changes of the water content of many gases with which it is in contact. Thus the wires 24 and 26 may be part of an electric circuit including a galvanometer or the like, and the resistance of the chemical film measured in order to determine the water vapor content of atmosphere or gas in contact with the face 44. The detector is particularly useful in connection with determining the water vapor content of oxygen for aviators flying at high altitudes, the determination being made at sea level. Too much moisture content in the oxygen results in freezing of droplets of the moisture, which restrict the metering orifices of oxygen systems, sometimes blocking the passages, and depositing on working parts and freezing thereon, which prevents proper functioning of the oxygen system. The maximum allowable water content which has been established by the U. S. Army Air Forces is 0.02 milligram of water per liter of oxygen. This is a relatively minute quantity of water vapor and is not easily measured by those methods which involve dew point determinations. By the chemical film method a sample of gas of known water content per unit volume (saturated at controlled temperature and pressure) may be passed over the chemical film, and the film will assume a certain resistance which can not be recorded. If a second sample of gas of unknown water content is then passed over the film the resistance will usually be changed, but may be restored to its original value by compressing or expanding the second sample until it contains the same quantity of water per unit volume as the first sample. When this condition is reached the pressure can be noted and the water content of the second sample, in relation to the first, computed. Since the pressure sometimes required to get the same reading on the second sample as the first sample may go as high as three thousand pounds, it is imperative that an electrode assembly be provided wherein there is no possibility of the insulation around the electrodes breaking down and permitting mechanical or electrical leakage. This is accomplished in our device by having the entire insulation bead 42 subjected on all sides to the same pressure so that there is no tendency for gas flow between the bead and the electrodes. At the same time, our device is readily removable from the cell block when it is necessary to renew the chemical film. The film evaporates, and it is therefore necessary to renew it after a number of tests, and this is conveniently done by unscrewing the cable connection 20 and then unscrewing the plug body P from the cell block. When the plug body is removed, the bead and the electrodes are adequately protected against mechanical injury by a sleeve-like extension 56 of the plug body which surrounds them. The extension is provided with openings 58 to permit of ready flow of gas all around the electrodes.

Some changes may be made in the construction and arrangement of the parts of our device without departing from the real spirit and purpose of our invention, and it is our intention to cover by our claims any modified forms of structure or use of mechanical equivalents which may be reasonably included within their scope.

We claim as our invention:

1. In a vapor detector, a plug body having a bore therethrough and adapted to be screwed into a cell block or the like, a portion of said bore being tapered, a tapered plug in said bore with the small end of the tapered plug disposed outwardly relative to said cell block, an electrical conductor entering said plug body and extending through said tapered plug and sealed in relation thereto, an electrode connected with said conductor on the inner side of said tapered plug, a second electrode adjacent the first electrode and substantially parallel thereto, and a bead of fused glass surrounding said electrodes, the ends of said electrodes being exposed to the media surrounding said bead, said second electrode being connected to said plug body to provide a grounded connection, said plug body having a tubular portion surrounding said bead and electrodes to protect them from mechanical injury.

2. In a vapor detector, a plug body having a bore therethrough and adapted to be screwed into a cell block or the like, a portion of said bore being tapered, a tapered plug in said bore with the small end of the tapered plug disposed outwardly relative to said cell block, an electrical conductor extending through said tapered plug and sealed in relation thereto, an electrode connected with said conductor on the inner side of said tapered plug, a second electrode adjacent the first electrode and substantially parallel thereto, and a bead of fused glass surrounding said electrodes, the ends of said electrodes being exposed to the media surrounding said bead, said second electrode being connected to said plug body to provide a grounded connection.

3. In a vapor detector, a plug body adapted to be screwed into an opening of a pressure container, a plug in said body, an electrical conductor entering said body, extending through said plug and sealed in relation thereto, an electrode connected with said conductor on the inner side of said plug, a second electrode adjacent the first electrode, and a bead of fused insulation surrounding said electrodes, the ends of said bead and said electrodes terminating in a plane, the ends of said electrodes being exposed to the media contacting said plane, said second electrode being connected to said plug body to provide a grounded connection.

4. A vapor detector comprising a body having a bore therethrough, a portion of said bore being tapered, a tapered plug in said bore, an electrical conductor entering said plug body and sealed through said tapered plug, an electrode connected with said conductor on the inner side of said tapered plug, a second electrode adjacent the first electrode and substantially parallel thereto, and insulation surrounding said electrodes and holding them in spaced relation, the ends of said electrodes being exposed to the media surrounding the insulation, said second electrode being connected to said plug body to provide a grounded connection.

5. A vapor detector of the character disclosed comprising a plug body having a bore therethrough, said body adapted to be mounted in an opening of a cell block or the like and subjected to pressure therein, a portion of said bore being tapered, a tapered plug in said portion with the small end of the plug outward, a terminal screw through said tapered plug, a cable removably connected with said plug body and having a circuit wire connected with said terminal screw, an electrode connected with the inner end of said terminal screw, a second electrode connected with the inner end of said plug body, said electrodes having terminal ends adjacent each other, and a bead of insulation surrounding said ends and supporting them in relation to each other with the ends of the electrodes exposed at the surface of said bead.

6. A vapor detector comprising a body adapted to be mounted in a cell block and subjected to high pressure therein, a plug in said body, a terminal screw through said plug, a cable removably connected with said body and having a pair of circuit wires, one connected with said terminal screw and the other grounded to said body, an electrode connected with the inner end of said terminal screw, a second electrode connected with the inner end of said body, said electrodes having terminal ends adjacent each other, and a bead of fused insulation surrounding said ends and supporting them in spaced relation to each other with portions of each of said electrodes exposed at the surface of said bead, said second electrode being grounded to said plug body.

7. A vapor detector of the character disclosed comprising a plug body adapted to be mounted in an opening of a cell block or the like and subjected to pressure therein, a cable removably connected with said plug body and having a pair of circuit wires, an electrode supported adjacent the inner end of said plug body and connected with one of said circuit wires, a second electrode supported adjacent the inner end of said plug body and connected with the other of said circuit wires, and a bead of insulation surrounding said electrodes, supporting them in spaced relation to each other with the ends of the electrodes exposed at the inner surface of said bead and exposed on all sides to the pressure in said cell block.

8. A vapor detector comprising a pair of electrodes, a fused glass bead surrounding said electrodes and supporting them in closely spaced relation, one side of said bead and the ends of said electrodes terminating in a plane surface to which a chemical film may be applied, said plane surface being exposed to the media containing vapor to be detected, means for supporting said electrodes at a point rearwardly of said bead, said means comprising a plug body, and means for sealing one of said electrodes relative to said plug body and insulating it therefrom.

9. A vapor detector comprising a pair of electrodes, a fused glass bead surrounding said electrodes and supporting them in closely spaced relation, one side of said bead and the ends of said electrodes terminating in a plane surface to which a chemical film may be applied, said plane surface being exposed to the media containing vapor to be detected, and means for supporting said electrodes at a point rearwardly of said bead.

10. A vapor detector comprising a pair of electrodes, a fused insulation bead surrounding said electrodes and supporting them in closely spaced relation, one side of said bead and the ends of said electrodes terminating in a plane surface to which a chemical film may be applied, and means for supporting said electrodes in a high pressure atmosphere with the surface in which said electrodes terminate in said atmosphere.

11. A vapor detector comprising a pair of electrodes, an insulating bead surrounding said electrodes and supporting them in spaced relation, said electrodes having end portions exposed to the media containing the vapor to be detected, a plug body for supporting said electrodes at a point rearwardly of said bead, said means comprising a plug body adapted to be mounted with one end in a pressure chamber, and means for sealing one of said electrodes relative to said plug body and insulating it therefrom.

RALPH T. MARETTE.
WILBUR R. RICHARDS.

REFERENCES CITED

The following references are of record in the file of this patent:

UNITED STATES PATENTS

| Number | Name | Date |
| --- | --- | --- |
| 903,090 | Hopkins | Nov. 3, 1908 |

FOREIGN PATENTS

| Number | Country | Date |
| --- | --- | --- |
| 296,778 | Great Britain | Apr. 25, 1929 |